United States Patent
Kellner et al.

(10) Patent No.: US 9,426,224 B1
(45) Date of Patent: Aug. 23, 2016

(54) PROTOCOL CONVERSION SYSTEM AND METHOD FOR A VEHICLE SYSTEM

(71) Applicant: General Electric Company, Schenectady, NY (US)

(72) Inventors: Steven Andrew Kellner, Melbourne, FL (US); Eugene Smith, Melbourne, FL (US); Glen Paul Peltonen, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/616,809

(22) Filed: Feb. 9, 2015

(51) Int. Cl.
*H04J 3/16* (2006.01)
*H04L 29/08* (2006.01)
*H04L 29/06* (2006.01)

(52) U.S. Cl.
CPC .............. *H04L 67/125* (2013.01); *H04L 69/08* (2013.01)

(58) Field of Classification Search
CPC .............................. H04L 67/125; H04L 69/08
See application file for complete search history.

(56) References Cited

U.S. PATENT DOCUMENTS

| | | | |
|---|---|---|---|
| 6,322,025 B1 | 11/2001 | Colbert et al. | |
| 6,434,450 B1 | 8/2002 | Griffin, Jr. et al. | |
| 7,979,198 B1 | 7/2011 | Kim et al. | |
| 8,139,493 B2 | 3/2012 | Kato et al. | |
| 8,510,026 B2 | 8/2013 | Desanzo et al. | |
| 2003/0114981 A1 | 6/2003 | Allen et al. | |
| 2003/0117298 A1 | 6/2003 | Tokunaga | |
| 2003/0151520 A1* | 8/2003 | Kraeling | B61L 3/27 340/13.24 |
| 2003/0214417 A1* | 11/2003 | Peltz | B61L 3/125 340/4.3 |
| 2004/0204829 A1 | 10/2004 | Endo | |
| 2004/0224630 A1 | 11/2004 | MacFarland | |
| 2005/0120904 A1* | 6/2005 | Kumar | B60L 15/32 105/35 |
| 2006/0129289 A1* | 6/2006 | Kumar | B60L 11/123 105/26.05 |
| 2008/0219274 A1 | 9/2008 | Kato | |
| 2009/0173839 A1 | 7/2009 | Groeneweg et al. | |
| 2009/0292411 A1* | 11/2009 | Smith | B60L 15/42 701/19 |
| 2010/0118988 A1* | 5/2010 | Smith, Jr. | B61L 27/0038 375/259 |
| 2010/0235017 A1* | 9/2010 | Peltonen | B61L 15/0081 701/2 |

(Continued)

FOREIGN PATENT DOCUMENTS

KR 1020130021652 A 3/2013

OTHER PUBLICATIONS

International Search Report and Written Opinion issued in connection with corresponding Application No. PCT/US2016/016921 dated Jun. 13, 2016.

*Primary Examiner* — Clemence Han
(74) *Attorney, Agent, or Firm* — GE Global Patent Operation

(57) ABSTRACT

A method and system for converting protocols of messages receive a first wireless message onboard a first vehicle in a vehicle consist that includes the first vehicle and one or more additional vehicles. The method and system also determine a first protocol of the first wireless message, determine a different, second protocol used by a control system disposed onboard the first vehicle, change the first wireless message to a different, second message by modifying the first protocol of the first wireless message to the different, second protocol, and communicate the second message to the control system.

33 Claims, 3 Drawing Sheets

(56) References Cited

U.S. PATENT DOCUMENTS

| | | | |
|---|---|---|---|
| 2010/0241295 A1* | 9/2010 | Cooper | B60T 13/665 701/19 |
| 2011/0099413 A1* | 4/2011 | Cooper | B61L 15/0027 714/4.1 |
| 2011/0153151 A1 | 6/2011 | Rogers et al. | |
| 2011/0183605 A1* | 7/2011 | Smith, Jr. | B61L 15/0027 455/7 |
| 2011/0270475 A1 | 11/2011 | Brand et al. | |
| 2012/0109447 A1 | 5/2012 | Yousefi et al. | |
| 2012/0116633 A1 | 5/2012 | Kato et al. | |
| 2012/0231787 A1 | 9/2012 | Conner | |
| 2012/0287972 A1* | 11/2012 | Noffsinger | B60T 13/665 375/219 |
| 2013/0151032 A1* | 6/2013 | Kraeling | H04L 45/74 701/1 |
| 2013/0261842 A1* | 10/2013 | Cooper | B61L 15/0081 701/1 |
| 2013/0279500 A1 | 10/2013 | Yousefi et al. | |

\* cited by examiner

PROTOCOL CONVERSION SYSTEM AND METHOD FOR A VEHICLE SYSTEM

FIELD

Embodiments of the inventive subject matter described herein relate to communications between vehicles in a vehicle consist.

BACKGROUND

Some known vehicle consists include several propulsion-generating vehicles that generate tractive effort for propelling the vehicle consists along a route. For example, trains may have several locomotives coupled with each other that propel the train along a track. The locomotives may communicate with each other in order to coordinate the tractive efforts and/or braking efforts provided by the locomotives. As one example, locomotives may be provided in a distributed power (DP) arrangement with one locomotive designated as a lead locomotive and other locomotives designated as remote locomotives. The lead locomotive may direct the tractive and braking efforts provided by the remote locomotives during a trip of the consist.

Some known consists use wireless communication between the locomotives for coordinating the tractive and/or braking efforts. For example, a lead locomotive can issue commands to the remote locomotives. The remote locomotives receive the commands and implement the tractive efforts and/or braking efforts directed by the commands.

Wireless messages can be communicated in a variety of different protocols. These different protocols can dictate the syntax, content, format, or the like, of the information included in the messages. Messages communicated in different protocols may not be understood by different systems. Systems onboard different vehicles may use different protocols and, as a result, these systems may not be able to communicate with each other.

In order to ensure that the vehicles in a vehicle consist are able to communicate with each other, the vehicles may need to all be the same type of vehicle and include systems that communicate using the same protocol. Because a wide variety of vehicle types and vehicle systems exist, forming a consist with only a single type of vehicle and vehicle systems that communicate using the same protocol can significantly limit the consists that can be formed.

BRIEF DESCRIPTION

In one embodiment, a method (e.g., for converting protocols of messages) includes receiving a first wireless message onboard a first vehicle in a vehicle consist that includes the first vehicle and one or more additional vehicles, determining a first protocol of the first wireless message, determining a different, second protocol used by a control system disposed onboard the first vehicle, changing the first wireless message to a different, second message by modifying the first protocol of the first wireless message to the different, second protocol, and communicating the second message to the control system.

In another embodiment, a system (e.g., a communication system) includes a communication unit having transceiving circuitry configured to be disposed onboard a first vehicle in a vehicle consist that includes the first vehicle and one or more additional vehicles. The communication unit can be configured to receive a first wireless message and to determine a first protocol of the first wireless message, and to determine a different, second protocol used by a control system disposed onboard the first vehicle. The communication unit also can be configured to change the first wireless message to a different, second message by modifying the first protocol of the first wireless message to the different, second protocol, and to communicate the second message to the control system.

In another embodiment, a method (e.g., for converting protocols of messages) includes receiving a first message at a remote vehicle from a lead vehicle in a vehicle consist that includes the lead vehicle remotely controlling movement of the remote vehicle along a route, determining a first protocol of the first message, determining a different, second protocol used by a control system disposed onboard the remote vehicle, changing the first protocol of the first message to the second protocol, and communicating the first message in the second protocol to the control system of the remote vehicle to control the movement of the remote vehicle.

BRIEF DESCRIPTION OF THE DRAWINGS

Reference is now made briefly to the accompanying drawings, in which.

DETAILED DESCRIPTION

Figure 1:
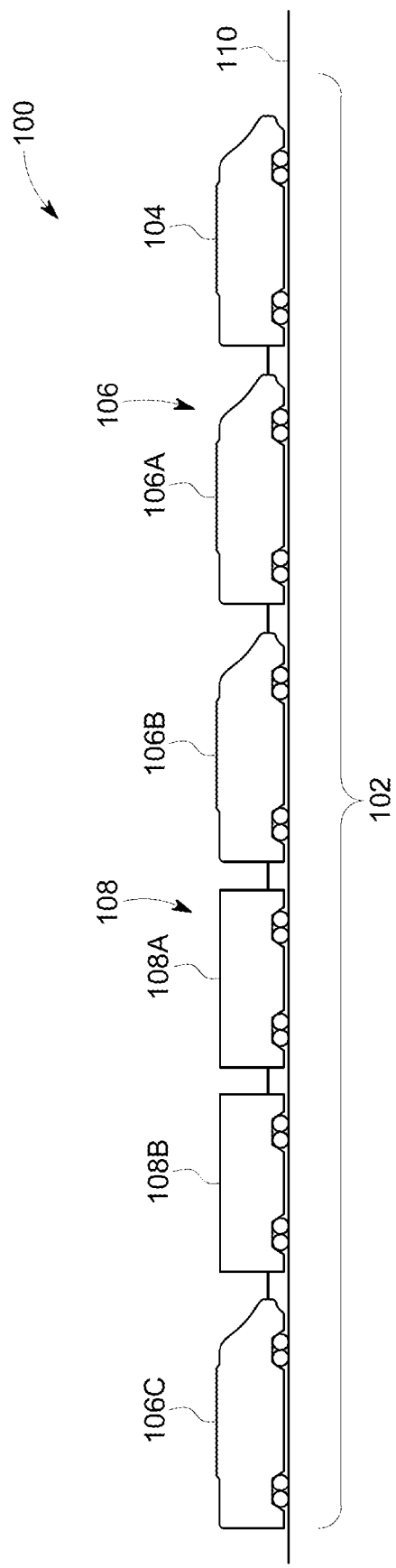
FIG. 1 illustrates one embodiment of a communication system of a vehicle consist or vehicle system.

One or more embodiments of the subject matter described herein provide for methods and systems for communicating with propulsion-generating vehicles in a vehicle consist. This subject matter may be used in connection with rail vehicles and rail vehicle consists, or alternatively may be used with other types of vehicles. The vehicle consist can include two or more vehicles mechanically coupled with each other to travel along a route together. Optionally, the vehicle consist can include two or more vehicles that are not mechanically coupled with each other, but that travel along a route together or that are otherwise controlled for coordinated movement along a route or for other coordinated travel in a transportation network. For example, two or more automobiles may wirelessly communicate with each other as the automobiles travel along the route in order to coordinate movements with each other.

Messages may be communicated between vehicles in the vehicle consists in order to remotely control operations of the vehicles. For example, a lead vehicle in a vehicle consist can remotely control other vehicles (e.g., remote vehicles) by wirelessly transmitting or broadcasting command messages to the remote vehicles. Similarly, one or more of the remote vehicles can wirelessly communicate messages (e.g., reply messages) back to the lead vehicle.

Onboard a vehicle that receives a message, one or more components of the communication system described herein can examine the received message and determine a protocol of the message. The protocol of a message can be a format of the message. A "format" of data or a message can represent the syntax in which the data or message is recorded, read, and/or communicated. For example, the format of a communication protocol may be based on a syntax of the protocol, such as one or more rules that define how various combinations of symbols, alphanumeric text, binary bits (e.g., 0's and 1's), and the like, are combined and used to represent and communicate data between a transmitter and a recipient that are communicating using the protocol.

A communication or messaging protocol may be an open format or a closed format. An "open format" includes a format that can be read (e.g., received and able to be used to perform one or more functions) by a plurality of different systems provided by different manufacturers or suppliers and/or that use different communication protocols to communicate and process data. Data communicated in an open format may be implemented (e.g., read, communicated, saved, used to perform a function, and the like) by both proprietary software or modules and open (e.g., open source) software or modules. An open format can be a format whose rules of syntax are publicly available, or at least provided by an entity that controls or owns the open format to one or more other entities. In one embodiment, an open format represents a format of data that is defined by one or more industry or standards organization for a variety of different entities (e.g., different persons, corporations, or the like) to use to communicate the data. Alternatively, an open format includes a format that is able to be used (e.g., to read and communicate data) by a recipient of the data that is different from the transmitter of the data. In another embodiment, an "open format" may include a format that is based on an open source format of communicating the data.

A "closed format" can include a format that may not be used (e.g., to read or communicate data) by other entities unless the other entities are granted access to details regarding the rules, syntax, and the like, of the format. For example, a closed format may be a proprietary format of a first entity that cannot be used by other entities without the first entity providing the rules and syntax of the format to the other entities. Data or messages communicated in a closed format may be unable to be implemented by proprietary software or modules that use a different format and/or open (e.g., open source) software or modules that use an open format. A closed format can be a format whose rules of syntax are not publicly available.

If the protocol of the received message differs from a message protocol used in the vehicle that receives the message, then the vehicle may modify the protocol of the received message. In one aspect, the protocol of the message can be converted into another protocol by changing a syntax of a set of bits of the data included in the message. As another example of protocol conversion, one or more subsets of bits of the data in the message can be unpacked or extracted for inclusion into a different, second message that is in another protocol. The protocol of a message can be changed by converting the data in the message by normalizing values of the data. The above examples are not all inclusive as additional conversion mechanisms may be used to change the protocol of a message. The protocol may be changed to a protocol that is used by the vehicle that receives the message. Changing the protocol of the message can form a new message. For example, a first message may be communicated in a first protocol, and upon receipt and modification of the first protocol of the first message into a different, second protocol, a different, second message may be formed.

The message having the changed protocol may then be communicated to a system onboard the vehicle that received the message. For example, the message with the converted protocol may then be communicated to control system (also referred to as a control unit) of the vehicle in order to control movement of the vehicle. Optionally, systems other than vehicles may receive messages, convert protocols of the messages, and use the messages in the converted protocol.

Vehicles may use different protocols when the vehicles are different types of vehicles. For example, in the context of rail vehicles, locomotives manufactured by different companies may use different protocols for messaging between the locomotives. As another example, locomotives that operate in different manners may use different protocols in messaging. A locomotive that consumes diesel fuel may use a different messaging protocol than the locomotive that is powered by electric current received from a source such as an overhead catenary, an electrified rail, and onboard battery, or the like. Prior to the subject matter described herein, these different types of vehicles may not have been able to be included in the same vehicle consist to communicate with each other and concurrently operate to move the vehicle consist.

The messages described herein may be communicated to and/or from locations that are off-board a vehicle. For example, a stationary facility, such as a dispatch facility, a maintenance facility, a repair facility, a vehicle yard, or the like, may communicate wireless messages to one or more vehicles in the vehicle consist that are in different protocols that are used by the vehicles. Optionally, the vehicles may communicate messages to the off-board facilities that are in different protocols used by the off-board facility. The vehicles and/or off-board facility can convert the protocols of messages received in different protocols that are used by the vehicles and/or off-board facilities.

In one aspect, changing the protocol of the message may change the data content of the message. For example, numerical values, settings, or the like, that are included in the wireless message may be changed upon converting the protocol of the message. With respect to vehicle consists, a lead vehicle may communicate a message that directs a remote vehicle to change a throttle setting of the remote vehicle to a setting designated by the message. Upon conversion of the protocol of the message, this throttle setting value communicated in the message in the previous protocol may be changed to another throttle setting in the new protocol.

The protocols of the messages may be determined in a variety of manners. As one example, the content of the received message may be examined in order to determine the protocol the message. Different protocols may be associated with different types of content in the messages. The data included in a received message may be compared to different sets of designated data content that are associated with different messaging protocols. Depending on which set of designated data contents that the data content in a received message matches (or more closely matches than other sets of designated data contents), the systems and methods described herein can determine the messaging protocol of the received message. Optionally, the message may identify the protocol used by the message. For example, a received message may include identifying data or datum that represents or identifies the protocol in which the message is communicated.

The messaging protocol used by a system in sending messages to other systems may change based on the protocol of a message received by the system. With respect to vehicle concepts, a remote vehicle may be configured to use a first messaging protocol for sending messages to the lead vehicle in the same vehicle consist. Upon receipt of a message from the lead vehicle in a different, second messaging protocol, the remote vehicle may change a messaging configuration of the remote vehicle so that the remote vehicle begins to use the same messaging protocol as the lead vehicle. For future messages, the remote vehicle may communicate the messages in the first messaging protocol used by the lead vehicle, as opposed to using the second messaging protocol that is not used by the lead vehicle. As a result, remote vehicles in the vehicle consist may adapt to the messaging protocol being used by the lead vehicle in the event that the lead vehicle uses a different messaging protocol than one or more, or all, of the remote vehicles in the vehicle consist.

FIG. 1 illustrates one embodiment of a communication system 100 of a vehicle consist or vehicle system 102. The illustrated vehicle consist 102 includes propulsion-generating vehicles 104, 106 (e.g., vehicles 104, 106A, 106B, 106C) and non-propulsion-generating vehicles 108 (e.g., vehicles 108A, 108B) that travel together along a route 110. Although the vehicles 104, 106, 108 are shown as being mechanically coupled with each other, optionally, the vehicles 104, 106, 108 may not be mechanically coupled with each other.

The propulsion-generating vehicles 104, 106 are shown as locomotives, the non-propulsion-generating vehicles 108 are shown as rail cars, and the vehicle consist 102 is shown as a train in the illustrated embodiment. Alternatively, the vehicles 104, 106 may represent other vehicles, such as automobiles, marine vessels, or the like, and the vehicle consist 102 can represent a grouping or coupling of these other vehicles. The number and arrangement of the vehicles 104, 106, 108 in the vehicle consist 102 are provided as one example and are not intended as limitations on all embodiments of the subject matter described herein.

In one embodiment, the group of vehicles 104, 106, 108 may be referred to as a vehicle system, with groups of one or more adjacent or neighboring propulsion-generating vehicles 104 and/or 106 being referred to as a vehicle consist. For example the vehicles 104, 106A, 106B, 108A, 108B, and 106C may be referred to as a vehicle system with vehicles 104, 106A, 106B be referred to as a first vehicle consist of the vehicle system and the vehicle 106C referred to as a second vehicle consist in the vehicle system. Alternatively, the vehicle consists may be defined as the vehicles that are adjacent or neighboring to each other, such as a vehicle consist defined by the vehicles 104, 106A, 106B, 108A, 108B, 106C.

The propulsion-generating vehicles 104, 106 can be arranged in a distributed power (DP) arrangement. For example, the propulsion-generating vehicles 104, 106 can include a lead vehicle 104 that issues command messages to the other propulsion-generating vehicles 106A, 106B, 106C which are referred to herein as remote vehicles. The designations "lead" and "remote" are not intended to denote spatial locations of the propulsion-generating vehicles 104, 106 in the vehicle consist 102, but instead are used to indicate which propulsion-generating vehicle 104, 106 is communicating (e.g., transmitting, broadcasting, or a combination of transmitting and broadcasting) command messages and which propulsion-generating vehicles 104, 106 are being remotely controlled using the command messages. For example, the lead vehicle 104 may or may not be disposed at the front end of the vehicle consist 102 (e.g., along a direction of travel of the vehicle consist 102). Additionally, the remote vehicles 106A-C need not be separated from the lead vehicle 104. For example, a remote vehicle 106A-C may be directly coupled with the lead vehicle 104 or may be separated from the lead vehicle 104 by one or more other remote vehicles 106A-C and/or non-propulsion-generating vehicles 108.

The command messages may include directives that direct operations of the remote vehicles. These directives can include propulsion commands that direct propulsion subsystems of the remote vehicles to move at a designated speed and/or power level, brake commands that direct the remote vehicles to apply brakes at a designated level, and/or other commands. The lead vehicle 104 issues the command messages to coordinate the tractive efforts and/or braking efforts provided by the propulsion-generating vehicles 104, 106 in order to propel the vehicle consist 102 along a route 110, such as a track, road, waterway, or the like.

The command messages can be communicated using the communication system 100. In one embodiment, the command messages are wirelessly communicated using the communication system 100. The communication system 100 may include wireless transceiving hardware and circuitry disposed onboard two or more of the vehicles 104, 106. Prior to the remote vehicles being remotely controlled by a lead vehicle in the vehicle consists, communication links may be established between the lead and remote vehicles.

Figure 2:
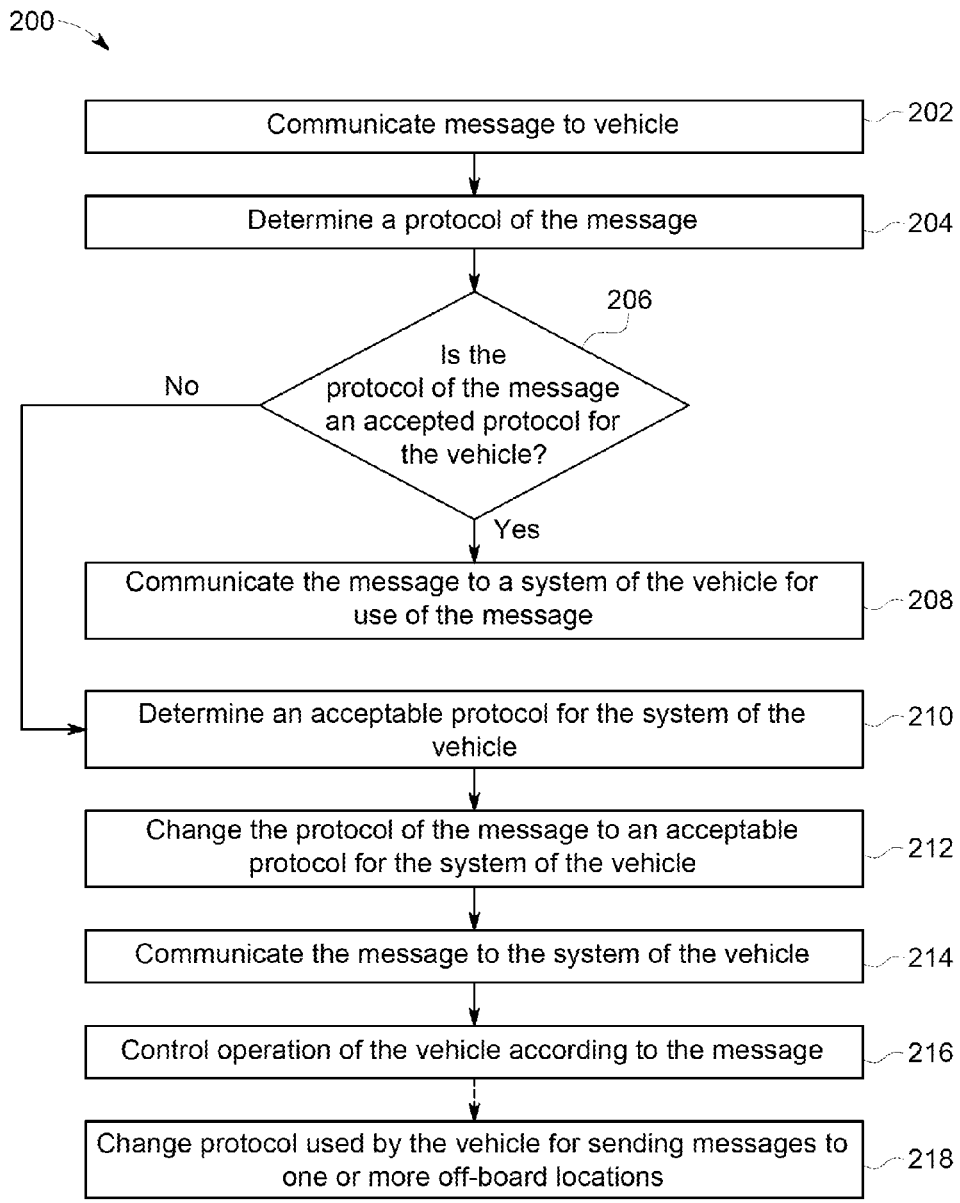
FIG. 2 illustrates a flowchart of one embodiment of a method for converting protocols of messages.

FIG. 2 illustrates a flowchart of one embodiment of a method 200 for converting protocols of messages. The method 200 may be performed by one or more embodiments of the communication systems described herein. At 202, a message is communicated to the vehicle. The message may be wirelessly communicated to vehicle from another vehicle, such as a lead vehicle communicating a command message to a remote vehicle in order to remotely control movement of the remote vehicle. Optionally, the message may be communicated from an off-board location to the vehicle, from the remote vehicle to the lead vehicle, or from another location. A device located off-board the vehicle (e.g., an operator handheld remote control) may remotely control movement of the vehicle by communicating wireless messages to the vehicle. While the description herein focuses on wireless communication messages, embodiments of the subject matter may relate communication of messages and other manners. For example, determining and changing messaging protocols as described herein also may be used with messages communicated over one or more conductive pathways, such as wires, cables, rails, bus bars, or the like. Additionally, the description herein focuses on vehicles, embodiments of the subject matter described herein also may relate to non-vehicle systems.

The message may be a command message that directs a vehicle to change operational settings. For example, a command message may be sent from a lead vehicle to a remote vehicle in order for the lead vehicle to remotely control a throttle setting, brake setting, speed, acceleration, or the like, of the remote vehicle. Optionally, the message may be a reply or response message sent from a remote vehicle to a lead vehicle to confirm receipt of a lead message and/or to notify the lead vehicle that the change in operational settings has been implemented.

At 204, a protocol of the message is determined. In one embodiment, the data content of the message may be examined in order to identify the protocol of the received message. The data content of a message can include the information included in the message, such as data represented by different bits, bytes, or the like, in the message. Different messaging protocols may format the data content of the message in different manners. For example, different messaging protocols may place the same information in different orders within the messages, using different values in the messages, in different locations within the messages (e.g., headers, payloads, trailers, or the like), etc. The data that is included in the received message can be examined to determine whether or not the format of the data corresponds to or matches the manner in which one or more protocols are known to format data within messages.

In one aspect, different sets of designated data contents, or formats of data contents, may be associated with different messaging protocols. The data content, or at least a portion thereof, of a received message can be examined and compared to the different sets of data content. If the format of the data content in a received message matches a set of designated data content associated with a first messaging protocol (or more closely matches the set of designated data content associated with the first messaging protocol than other sets of designated data contents associated with other messaging protocols), then the received message may be identified as being in the first messaging protocol.

Figure 3:
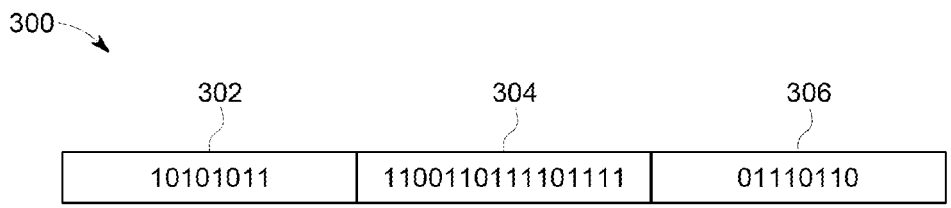
FIG. 3 is a schematic diagram of a message in accordance with one embodiment.

FIG. 3 is a schematic diagram of a message 300 in accordance with one embodiment. The message 300 may be communicated as a series of bits that are included or arranged in frames, such as a header frame 302, a data (or payload) frame 304, and a footer (or trailer) frame 306. Alternatively, the message 300 may be composed of a series of bits that are arranged in another format. The arrangement of the bits in the message 300 may indicate which protocol is used to communicate the message 300. For example, one or more bits in the header frame 302 and/or the footer frame 306 may indicate the format that is used to communicate the message 300. The data frame 304 can include bits that represent information conveyed by the message 300, such as a value of one or more settings, data parameters, or the like.

One or more subsets of the header frame 302, the data frame 304, and/or the footer frame 306 can be examined to determine the protocol of the message 300. For example, one or more bits of the message 300 can be extracted and compared to different identification sets of bits associated with different messaging protocols. Based on this comparison, the protocol of the message 300 can be determined. In one embodiment, the extracted set of bits from the message 300 (e.g., the first through $n^{th}$ bits in one or more of the frames 302, 304, and/or 306) to one or more identification sets of bits recorded in a memory, such as a table (e.g., a look-up table), list, or other logical structure, to determine a degree of match between the extracted bits and the recorded sets. The identification sets may include different sets of bits that are associated with different message protocols.

The degree of match between the extracted set from the message 300 and an identification set can be measured as a percentage, fraction, or other quantifiable measurement that represents how much of the extracted set is the same as the identification set. If the degree of match between the extracted set and the identification set exceeds a threshold, then the protocol of the message 300 is identified as the format associated with the identification set in the memory. On the other hand, if the degree of match does not exceed the threshold, then the protocol of the message 300 is not identified as the protocol associated with the identification set in the memory structure.

As another example, the received message may identify the messaging protocol of the message. The message can include identifying data or datum that represents the protocol of the message. Different protocols may be associated with different names, different numerical values included in the message, or other information that is included in the message. This may be data that is added to the message in order to identify the protocol. Based on the presence of this identifying information, the protocol of the received message can be identified. Alternatively, the absence of identifying information may be used to identify the protocol of a received message. For example, one or more protocols may not include identifying information in messages communicating using the one or more protocols. The failure to find the identifying information in a received message may be used to determine that the received message is communicated using one of these protocols.

Returning to the description of the flowchart of the method 200 shown in FIG. 2, at 206, a determination is made as to whether or not the protocol of the received message is an accepted protocol for the vehicle. An accepted protocol represents a protocol that can be read, understood, or otherwise used by the vehicle or a system of the vehicle. An unacceptable protocol includes protocols that are not able to be read, understood, or otherwise used by the vehicle or system that is onboard the vehicle. The acceptable protocols for the vehicle and/or system of the vehicle may be stored in a memory of the vehicle (described below).

If the protocol of the received message is an acceptable protocol, then the protocol the message may not need to be converted to another protocol in order for the vehicle to use the received message. As a result, flow of the method 200 can proceed to 208. On the other hand, if the protocol of the received message is not an acceptable protocol for the vehicle or system of the vehicle, then the protocol of the message may need to be converted before the vehicle or system of the vehicle can use the message. As a result, flow of the method 200 can proceed to 210.

At 210, an acceptable protocol for the vehicle is determined. For example, a system onboard the vehicle may be able to read, understand, or otherwise use messages communicated in one or more designated protocols. The acceptable protocol or protocols may be stored in a memory of the vehicle (described below).

At 212, the protocol of the message is changed to an acceptable protocol of the vehicle and/or system of the vehicle that will be using the message. The message protocol can be changed in one or more ways. For example, changing the format of the message can modify the protocol of the message from an unacceptable protocol to an acceptable protocol. In one aspect, the protocol of the message can be converted into another protocol by changing a syntax of a set of bits of the data included in the message. As another example of protocol conversion, one or more subsets of bits of the data in the message can be unpacked or extracted for inclusion into a different, second message that is in another protocol. The protocol of a message can be changed by converting the data in the message by normalizing values of the data. The above examples are not all inclusive as additional conversion mechanisms may be used to change the protocol of a message. The protocol of a message can be changed from a first protocol (e.g., a first closed format) to a different, second protocol (e.g., an open format or a different, second closed format). The protocol of a message can be changed by modifying the values and/or order of one or more subsets of the message (e.g., such as the bits in the message 300 shown in FIG. 3).

In one embodiment, the protocol of a message is converted by changing an identification of a numerical value that is conveyed by the message. For example, different numerical values may be included in a message to represent different operational settings that a system or the vehicle is to implement (e.g., throttle settings, brake settings, speeds, accelerations, etc.). These values can be referred to as data parameters, and may be identified in messages by different or unique identification numbers or alphanumeric strings. The identifications of the data parameters may be conveyed in the messages (e.g., the message 300 shown in FIG. 3) to notify recipients of the message of the data parameter that is represented by the message. The identifications may be conveyed in the header frame 302 (shown in FIG. 3) of the message that communicates the data parameter, or in another location.

The identifications used to distinguish between the different data parameters may vary between different protocols. The identification in a first message may be changed to a different identification used by a different, second protocol. The identification used in the message of a first protocol that is received may be referred to as an input data parameter identification and the identification used in the message of a second protocol after converting the message protocol may be referred to as an output data parameter identification.

In another example, the protocol of a message can be converted to another protocol by changing a size of the message. Different protocols may use differently sized messages. For example, a first protocol may use a first number of bits to convey the message 300 (shown in FIG. 3) while a different, second protocol may use a different, second number of bits to convey the message 300. The size of the message in a first protocol that is received may be referred to as an input size of the message and the converted size of the message in the different, second protocol may be referred to as an output size of the message. Changing the size of a message can involve removing portions of the message that do not change the value of the data parameter. Changing the size of a message can involve adding one or more bits to the message that do not alter the value of the data parameter conveyed by the message.

In another example, the protocol of a message is changed by applying a multiplier to one or more values represented by data in the message. For example, the value represented by data in the message can be multiplied by one or more constants to change the value from an initial value to a converted value. For example, an initial value (I) in a message may be multiplied by a constant (k) to create a converted value (C=I×k). The converted value is included in the message in the converted protocol.

In another example, the protocol of a message can be changed by applying a divisor to one or more values represented by data in the message. For example, the value represented by data in the message can be divided by one or more constants to change the value from an initial value to a converted value. An initial value (I) in the message in a first protocol may be divided by a constant (k) to create a converted value (C=I/k). The converted value can be included in the message in the converted protocol.

In another example, the protocol of a message can be changed by applying a bias to one or more values represented by data in the message. One or more constants may be added to or subtracted from a value of data in the message to change the value from an initial value to a converted value and thereby convert the protocol of the message. For example, an initial value (I) may be changed by a constant (b) to create a converted value (C=I+b). The converted value can be included in the message in the converted protocol.

In another example, the protocol of a message can be changed by altering a position of a decimal in one or more values represented by data in the message. The position of a decimal in a value of a message in a first protocol may be shifted to another position to convert the protocol of the message to a second protocol. For example, an input message may include a value of 123.456. Converting the protocol of the message may occur by shifting the decimal point of the value to 12.3456 or 1234.56 and including the value having the shifted decimal point in a converted protocol message.

The protocol of a message can be changed by extracting a portion of the message and conveying the extracted portion in another message. For example, based on the protocol of the received message and the acceptable protocol of the vehicle that received the message, a start bit and a number of read bits may be identified. Different protocols may be associated with different starting bits and/or different numbers of read bits in a memory. Based on the identified protocol of the received message and the acceptable protocol of the vehicle or system, the starting bit and number of read bits can be determined. The start bit indicates where in a data string that a portion of the data is to be extracted from and the number of read bits identifies how much of the data string starting at the start bit is to be extracted. As one example, a message may include the data string represented as "HGFEDCBA." If the start bit is four and the number of read bits is one, the bit "E" may be extracted from the message and included in a message in a converted protocol.

The preceding provides some examples of the manners in which the protocol of a message can be changed. The above examples, however, are not exclusive. Other techniques and methods of converting the protocol of the messages may be used.

Returning to the description of the flowchart the method 200 shown in FIG. 2, at 214, the message in the converted protocol is communicated to a system of the vehicle, such as a control system or control unit (described below). The message in the converted protocol may be communicated to the control system or other system that uses information included in the message of the converted protocol to control one or more operations of the vehicle. For example, a control system of the vehicle may change a throttle setting, brake setting, speed, acceleration, or the like, of the vehicle based on information included in the message in the converted protocol. In doing so, a lead vehicle using a first messaging protocol can remotely control movement of a remote vehicle that cannot understand or use messages in the first protocol, but that can understand or use messages in a different, second messaging protocol.

At 216, operation of the vehicle is controlled according to the message in the converted protocol. A control system or unit of the vehicle may change one or more operational settings of the vehicle based on information included in the message in the converted protocol. For example, the control system may change a throttle setting, brake setting, speed, acceleration, or the like, of the vehicle based on the information included in the converted message.

In one embodiment, at 218, the protocol used by the vehicle for sending messages to one or more off-board locations is changed. For example, if the remote vehicle communicates messages using a first messaging protocol, but receives one or more messages from a lead vehicle in a different, second messaging protocol, then the remote vehicle can switch from communicating messages in the first protocol to the second protocol. The remote vehicle may begin communicating messages to the lead vehicle or other vehicles using the second messaging protocol. In doing so, the remote vehicle can adapt to different messaging protocols used by other vehicles or sources of messages. Alternatively, the method 200 may not include the operations described in connection with 218 in FIG. 2.

Figure 4:
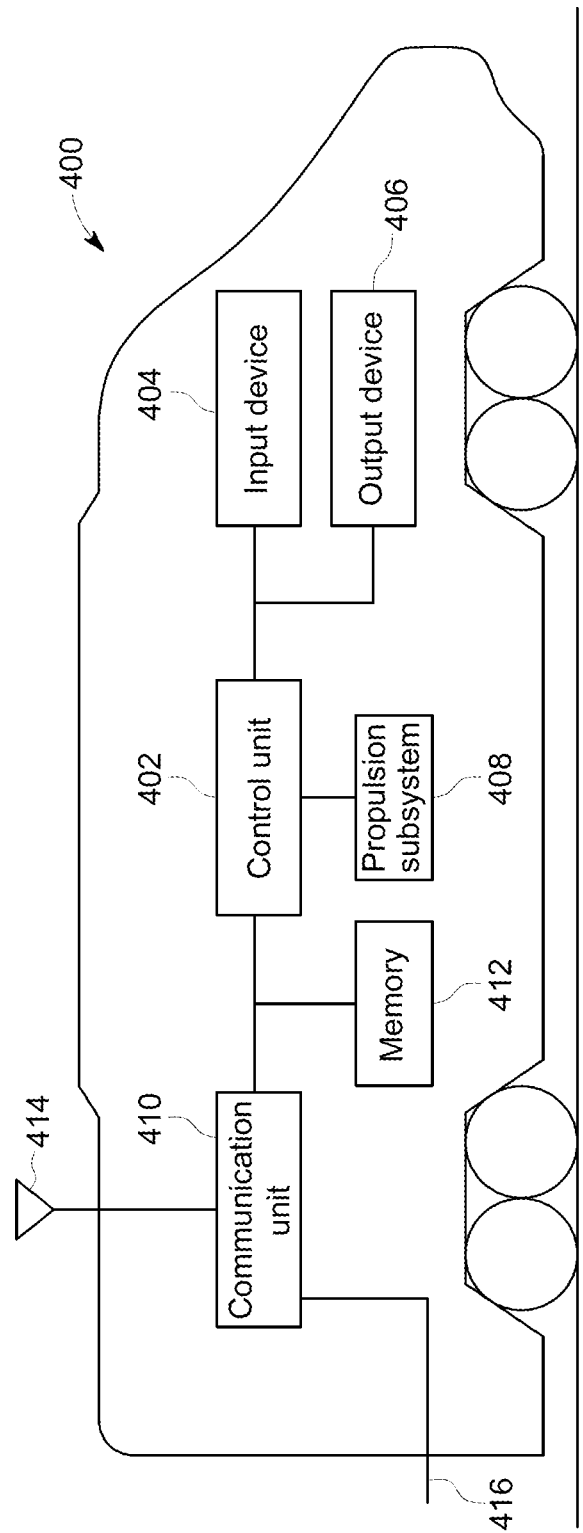
FIG. 4 is a schematic diagram of a propulsion-generating vehicle in accordance with one embodiment.

FIG. 4 is a schematic diagram of a propulsion-generating vehicle 400 in accordance with one embodiment. The vehicle 400 may represent one or more of the vehicles 104, 106 shown in FIG. 1. The communication system 100 shown in FIG. 1 may include one or more components onboard the vehicle 400 that are used to establish communication links between the vehicle 400 and one or more other vehicles in the same vehicle consist.

The vehicle 400 includes a control unit or control system 402 that controls operations of the vehicle 400. The control unit 402 can include or represent one or more hardware circuits or circuitry that include, are connected with, or that both include and are connected with one or more processors, controllers, or other hardware logic-based devices. The control unit 402 is connected with an input device 404 and an output device 406. The control unit 402 can receive manual input from an operator of the propulsion-generating vehicle 400 through the input device 404, such as a touchscreen, keyboard, electronic mouse, microphone, or the like. For example, the control unit 402 can receive manually input changes to the tractive effort, braking effort, speed, power output, and the like, from the input device 404. The control unit 402 can present information to the operator using the output device 406, which can represent a display screen (e.g., touchscreen or other screen), speakers, printer, or the like. For example, the control unit 402 can present the contents, protocols, or the like, of messages received by the vehicle 400 and/or communicated from the vehicle 400.

The control unit 402 is connected with a propulsion subsystem 408 of the propulsion-generating vehicle 400. The propulsion subsystem 408 provides tractive effort and/or braking effort of the propulsion-generating vehicle 400. The propulsion subsystem 408 may include or represent one or more engines, motors, alternators, generators, brakes, batteries, turbines, and the like, that operate to propel the propulsion-generating vehicle 400 under the manual or autonomous control that is implemented by the control unit 400. For example, the control unit 400 can generate control signals autonomously or based on manual input that is used to direct operations of the propulsion subsystem 408.

The control unit 402 also is connected with a communication unit 410 and a memory 412 of the communication system in the propulsion-generating vehicle 400. The memory 412 can represent an onboard device that electronically and/or magnetically stores data. For example, the memory 412 may represent a computer hard drive, random access memory, read-only memory, dynamic random access memory, an optical drive, or the like. The communication unit 410 includes or represents hardware and/or software that is used to communicate with other vehicles 400 in the vehicle consist 102. For example, the communication unit 410 may include a transceiver and associated circuitry (e.g., antennas) 414 for wirelessly communicating (e.g., communicating and/or receiving) messages. Optionally, the communication unit 410 includes circuitry for communicating the messages over a wired connection 416, such as an electric multiple unit (eMU) line of the vehicle consist 102 or another conductive pathway between or among the propulsion-generating vehicles 104, 106, 400 in the vehicle consist 102. The control unit 402 may control the communication unit 410 by activating the communication unit 410.

The communication unit 410 can examine the messages that are received by the vehicle 400 and determine whether the protocol of the messages needs to be changed. As described above, the communication unit 410 can determine the protocol of received messages, determine if the protocol is acceptable to the vehicle 400 or the control unit 402 of the vehicle 400, and change the protocol of the message (which may include forming a new message with the new protocol or changing the protocol of the received message without forming a new message).

The memory 412 can store messaging protocols and information used to determine protocols of received messages, information to determine acceptable protocols of the vehicle 400 and/or control unit 412, information on how to change protocols of a message, and the like. For example, the memory 412 can store sets of data content of messages associated with different protocols, identifying information included in messages associated with different protocols, and other information described herein that can be used by the communication unit 410 to determine the protocol of a received message.

In one embodiment, a method (e.g., for converting protocols of messages) includes receiving a first wireless message onboard a first vehicle in a vehicle consist that includes the first vehicle and one or more additional vehicles, determining a first protocol of the first wireless message, determining a different, second protocol used by a control system disposed onboard the first vehicle, changing the first wireless message to a different, second message by modifying the first protocol of the first wireless message to the different, second protocol, and communicating the second message to the control system.

In one aspect, receiving the first wireless message can include receiving the first wireless message from a second vehicle of the one or more additional vehicles. The method also can include controlling movement of the first vehicle based at least in part on data included in the first wireless message.

In one aspect, the first vehicle and the second vehicle can be different types of vehicles.

In one aspect, receiving the first wireless message can include receiving the first wireless message from a stationary facility disposed off-board the vehicle consist. The method also can include controlling movement of the first vehicle based at least in part on data included in the first wireless message.

In one aspect, changing the first wireless message to the different, second message can include changing first data content of the first wireless message to different, second data content of the second message.

In one aspect, determining the first protocol of the first wireless message can include comparing data content of the first wireless message with designated data contents associated with different message protocols and selecting the second protocol from among the different message protocols based (at least in part) on comparing the data content of the first wireless message with the designated data contents associated with the different message protocols.

In one aspect, determining the first protocol of the first wireless message can include examining protocol identifying datum or data included in the first wireless message that identifies the first protocol.

In one aspect, prior to determining the first protocol of the first wireless message received at the first vehicle, the first vehicle can be configured to communicate one or more other wireless messages in one or more other protocols that differ from the first protocol.

In one aspect, the method can include changing a communication configuration of the first vehicle responsive to determining the first protocol of the first wireless message received at the first vehicle such that one or more third wireless messages communicated from the first vehicle to the second vehicle are communicated in the first protocol.

In another embodiment, a system (e.g., a communication system) includes a communication unit having transceiving circuitry configured to be disposed onboard a first vehicle in a vehicle consist that includes the first vehicle and one or more additional vehicles. The communication unit can be configured to receive a first wireless message and to determine a first protocol of the first wireless message, and to determine a different, second protocol used by a control system disposed onboard the first vehicle. The communication unit also can be configured to change the first wireless message to a different, second message by modifying the first protocol of the first wireless message to the different, second protocol, and to communicate the second message to the control system.

In one aspect, the communication unit can be configured to receive the first wireless message from a second vehicle of the one or more additional vehicles. The system also can include the control system that is configured to control movement of the first vehicle based at least in part on data included in the first wireless message.

In one aspect, the first vehicle and the second vehicle can be different types of vehicles.

In one aspect, the communication unit can be configured to receive the first wireless message from a stationary facility disposed off-board the vehicle consist. The system also can include the control system that is configured to control movement of the first vehicle based at least in part on data included in the first wireless message.

In one aspect, the communication unit can be configured to change the first wireless message to the different, second message by changing first data content of the first wireless message to different, second data content of the second message.

In one aspect, the communication unit can be configured to determine the first protocol of the first wireless message by comparing data content of the first wireless message with designated data contents associated with different message protocols and selecting the second protocol from among the different message protocols based on comparing the data content of the first wireless message with the designated data contents associated with the different message protocols.

In one aspect, the communication unit can be configured to determine the first protocol of the first wireless message by examining protocol identifying datum or data included in the first wireless message that identifies the first protocol.

In one aspect, prior to determining the first protocol of the first wireless message received at the first vehicle, the communication unit can be configured to communicate one or more other wireless messages to the second vehicle in one or more other protocols that differ from the first protocol. The communication unit can be configured to change a communication configuration of the communication unit responsive to determining the first protocol of the first wireless message received at the first vehicle such that one or more third wireless messages communicated from the communication unit to the second vehicle are communicated in the first protocol.

In another embodiment, a method (e.g., for converting protocols of messages) includes receiving a first message at a remote vehicle from a lead vehicle in a vehicle consist that includes the lead vehicle remotely controlling movement of the remote vehicle along a route, determining a first protocol of the first message, determining a different, second protocol used by a control system disposed onboard the remote vehicle, changing the first protocol of the first message to the second protocol, and communicating the first message in the second protocol to the control system of the remote vehicle to control the movement of the remote vehicle.

In one aspect, the lead vehicle and the remote vehicles can be different types of vehicles.

In one aspect, the method also can include changing a protocol used by the remote vehicle to communicate a reply message to the lead vehicle responsive to determining the first protocol of the command message received from the lead vehicle.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A method comprising:
    receiving a first wireless message onboard a first vehicle in a vehicle consist that includes the first vehicle and one or more additional vehicles;
    determining a first protocol of the first wireless message;
    determining a different, second protocol used by a control system disposed onboard the first vehicle;

changing the first wireless message to a different, second message by modifying the first protocol of the first wireless message to the different, second protocol; and communicating the second message to the control system, wherein determining the first protocol of the first wireless message includes comparing data content of the first wireless message with designated data contents associated with different message protocols, and wherein determining the second protocol includes selecting the second protocol from among the different message protocols based on comparing the data content of the first wireless message with the designated data contents associated with the different message protocols.

2. The method of claim 1, wherein receiving the first wireless message includes receiving the first wireless message from a second vehicle of the one or more additional vehicles, and further comprising controlling movement of the first vehicle based at least in part on data included in the first wireless message.

3. The method of claim 2, wherein the first vehicle and the second vehicle are different types of vehicles.

4. The method of claim 1, wherein receiving the first wireless message includes receiving the first wireless message from a stationary facility disposed off-board the vehicle consist, and further comprising controlling movement of the first vehicle based at least in part on data included in the first wireless message.

5. The method of claim 1, wherein changing the first wireless message to the different, second message includes changing first data content of the first wireless message to different, second data content of the second message.

6. The method of claim 1, wherein determining the first protocol of the first wireless message includes examining protocol identifying datum or data included in the first wireless message that identifies the first protocol.

7. The method of claim 1, wherein, prior to determining the first protocol of the first wireless message received at the first vehicle, the first vehicle is configured to communicate one or more other wireless messages in one or more other protocols that differ from the first protocol.

8. The method of claim 7, further comprising changing a communication configuration of the first vehicle responsive to determining the first protocol of the first wireless message received at the first vehicle such that one or more third wireless messages communicated from the first vehicle to the second vehicle are communicated in the first protocol.

9. A system comprising:

a communication unit including transceiving circuitry configured to be disposed onboard a first vehicle in a vehicle consist that includes the first vehicle and one or more additional vehicles, the communication unit configured to receive a first wireless message and to determine a first protocol of the first wireless message, the communication unit also is configured to determine a different, second protocol used by a control system disposed onboard the first vehicle, to change the first wireless message to a different, second message by modifying the first protocol of the first wireless message to the different, second protocol, and to communicate the second message to the control system, wherein the communication unit is configured to determine the first protocol of the first wireless message by comparing data content of the first wireless message with designated data contents associated with different message protocols and selecting the second protocol from among the different message protocols based on comparing the data content of the first wireless message with the designated data contents associated with the different message protocols.

10. The system of claim 9, wherein the communication unit is configured to receive the first wireless message from a second vehicle of the one or more additional vehicles, and further comprising the control system configured to control movement of the first vehicle based at least in part on data included in the first wireless message.

11. The system of claim 10, wherein the first vehicle and the second vehicle are different types of vehicles.

12. The system of claim 9, wherein the communication unit is configured to receive the first wireless message from a stationary facility disposed off-board the vehicle consist, and further comprising the control system configured to control movement of the first vehicle based at least in part on data included in the first wireless message.

13. The system of claim 9, wherein the communication unit is configured to change the first wireless message to the different, second message by changing first data content of the first wireless message to different, second data content of the second message.

14. The system of claim 9, wherein the communication unit is configured to determine the first protocol of the first wireless message by examining protocol identifying datum or data included in the first wireless message that identifies the first protocol.

15. The system of claim 9, wherein, prior to determining the first protocol of the first wireless message received at the first vehicle, the communication unit is configured to communicate one or more other wireless messages to the second vehicle in one or more other protocols that differ from the first protocol, and wherein the communication unit is configured to change a communication configuration of the communication unit responsive to determining the first protocol of the first wireless message received at the first vehicle such that one or more third wireless messages communicated from the communication unit to the second vehicle are communicated in the first protocol.

16. A method comprising:

receiving a first message at a remote vehicle from a lead vehicle in a vehicle consist that includes the lead vehicle remotely controlling movement of the remote vehicle along a route;

determining a first protocol of the first message;

determining a different, second protocol used by a control system disposed onboard the remote vehicle;

changing the first protocol of the first message to the second protocol; and communicating the first message in the second protocol to the control system of the remote vehicle to control the movement of the remote vehicle, wherein, prior to determining the first protocol of the first wireless message received at the remote vehicle, the remote vehicle is configured to communicate one or more wireless messages in one or more other protocols that differ from the first protocol.

17. The method of claim 16, wherein the lead vehicle and the remote vehicles are different types of vehicles.

18. The method of claim 16, further comprising changing a protocol used by the remote vehicle to communicate a reply message to the lead vehicle responsive to determining the first protocol of the command message received from the lead vehicle.

19. A method comprising:
receiving a first wireless message onboard a first vehicle in a vehicle consist that includes the first vehicle and one or more additional vehicles;
determining a first protocol of the first wireless message;
determining a different, second protocol used by a control system disposed onboard the first vehicle;
changing the first wireless message to a different, second message by modifying the first protocol of the first wireless message to the different, second protocol; and
communicating the second message to the control system,
wherein, prior to determining the first protocol of the first wireless message received at the first vehicle, the first vehicle is configured to communicate one or more other wireless messages in one or more other protocols that differ from the first protocol.

20. The method of claim 19, wherein receiving the first wireless message includes receiving the first wireless message from a second vehicle of the one or more additional vehicles, and further comprising controlling movement of the first vehicle based at least in part on data included in the first wireless message.

21. The method of claim 20, wherein the first vehicle and the second vehicle are different types of vehicles.

22. The method of claim 19, wherein receiving the first wireless message includes receiving the first wireless message from a stationary facility disposed off-board the vehicle consist, and further comprising controlling movement of the first vehicle based at least in part on data included in the first wireless message.

23. The method of claim 19, wherein changing the first wireless message to the different, second message includes changing first data content of the first wireless message to different, second data content of the second message.

24. The method of claim 19, wherein determining the first protocol of the first wireless message includes comparing data content of the first wireless message with designated data contents associated with different message protocols, and selecting the second protocol from among the different message protocols based on comparing the data content of the first wireless message with the designated data contents associated with the different message protocols.

25. The method of claim 19, wherein determining the first protocol of the first wireless message includes examining protocol identifying datum or data included in the first wireless message that identifies the first protocol.

26. The method of claim 19, further comprising changing a communication configuration of the first vehicle responsive to determining the first protocol of the first wireless message received at the first vehicle such that one or more third wireless messages communicated from the first vehicle to the second vehicle are communicated in the first protocol.

27. A system comprising:
a communication unit including transceiving circuitry configured to be disposed onboard a first vehicle in a vehicle consist that includes the first vehicle and one or more additional vehicles, the communication unit configured to receive a first wireless message and to determine a first protocol of the first wireless message, the communication unit also is configured to determine a different, second protocol used by a control system disposed onboard the first vehicle, to change the first wireless message to a different, second message by modifying the first protocol of the first wireless message to the different, second protocol, and to communicate the second message to the control system,
wherein, prior to determining the first protocol of the first wireless message received at the first vehicle, the communication unit is configured to communicate one or more other wireless messages to the second vehicle in one or more other protocols that differ from the first protocol, and
wherein the communication unit is configured to change a communication configuration of the communication unit responsive to determining the first protocol of the first wireless message received at the first vehicle such that one or more third wireless messages communicated from the communication unit to the second vehicle are communicated in the first protocol.

28. The system of claim 27, wherein the communication unit is configured to receive the first wireless message from a second vehicle of the one or more additional vehicles, and further comprising the control system configured to control movement of the first vehicle based at least in part on data included in the first wireless message.

29. The system of claim 28, wherein the first vehicle and the second vehicle are different types of vehicles.

30. The system of claim 27, wherein the communication unit is configured to receive the first wireless message from a stationary facility disposed off-board the vehicle consist, and further comprising the control system configured to control movement of the first vehicle based at least in part on data included in the first wireless message.

31. The system of claim 27, wherein the communication unit is configured to change the first wireless message to the different, second message by changing first data content of the first wireless message to different, second data content of the second message.

32. The system of claim 27, wherein the communication unit is configured to determine the first protocol of the first wireless message by comparing data content of the first wireless message with designated data contents associated with different message protocols and selecting the second protocol from among the different message protocols based on comparing the data content of the first wireless message with the designated data contents associated with the different message protocols.

33. The system of claim 27, wherein the communication unit is configured to determine the first protocol of the first wireless message by examining protocol identifying datum or data included in the first wireless message that identifies the first protocol.

* * * * *